3,459,503
Patented Aug. 5, 1969

3,459,503
HOT PRESSING TITANIUM DIOXIDE
Donald W. Roy and William F. Parsons, Rochester, N.Y., assignors to Eastman Kodak Company, Rochester, N.Y., a corporation of New Jersey
No Drawing. Filed Jan. 3, 1966, Ser. No. 517,937
Int. Cl. C04b 35/46; B29d 11/00; C01g 23/08
U.S. Cl. 23—202
9 Claims

ABSTRACT OF THE DISCLOSURE

Producing infrared transmitting titanium dioxide optical elements by hot pressing titanium dioxide powder at a temperature of 800–1300° C. and at a pressure greater than 20,000 p.s.i. The resulting product has a density of from 99% up to and including the theoretical density of titanium dioxide.

---

This invention relates to a titanium dioxide optical element having unusual strength and thermal stability, and to the method for making such elements. More particularly, the invention pertains to an article of titanium dioxide comprising substantially voidlessly fused powdered particles displaying optical homogeneity and infrared transparency, which article is highly qualified for optical applications.

While a number of materials which transmit infrared radiation are known, the range of desirable properties available to a designer is still quite limited. A large number of the known materials display inherent shortcomings which limit their usefulness in contemporary applications, such as heat-seeking guidance devices in missiles and aircraft fire control systems. It is apparent that present demands require infrared transmitting optical elements better than the rock salt lens disclosed in U.S. Patent No. 2,642,367.

An infrared transmitting element in an air-to-air missile, for example, will be expoesd to extremes in atmospheric conditions, air friction and temperature change. The air friction and temperature change considerations impose substantial problems while the missile is merely being transported by a supersonic interceptor, but conditions are even more extreme during the critical time when the missile is fired and travels at speeds many times the speed of sound.

A known type of infrared transmitting element is the single crystal form of certain limited substances. The single crystal form is considered to include joined, similarly oriented macro crystals. This form is generally used only in laboratory equipment where size requirements are moderate. It is well known that single crystals often display planes of cleavage which make them susceptible to breakage by even a small force applied parallel to the plane of cleavage. These same planes of cleavage usually make it extremely difficult to grind or otherwise form single crystals into the more common shapes of optical elements, such as lenses or domes. Single crystals of substantial size are difficult and expensive to produce. Even when a large single crystal is successfully grown, it must be treated as a relatively delicate object because of its tendency to break along the planes of cleavage.

When a material which transmits infrared radiation in the single crystal form is recast in the more durable and workable polycrystalline form by melting and cooling, the resulting voids severely curtail infrared transmittance in the melt-cooled polycrystalline form. Imperfect crystallization or voids exist at the interfaces between crystallites. Such voids function as scattering sites for infrared radiation and negate the infrared properties of the material.

Glasses usually do not transmit infrared radiation beyond 5 microns. Therefore, there is little use of glass to transmit infrared radiation, except for short infrared wavelength applications.

According to the instant invention, superior infrared transmitting optical elements or windows of titanium dioxide are produced by subjecting powdered particles of the material to conditions of relatively high temperatures and pressure under inert conditions. The temperatures under which the elements of the instant invention are produced must be below the melting temperature of the titanium dioxide, but must be high enough to permit plastic deformation of the powdered particles under the high pressure applied. A critical temperature range peculiar to titanium dioxide is thus involved. Similarly, there is a critical threshold pressure for hot pressing titanium dioxide. This combination of relatively high temperatures and pressures permits the powdered particles to plastically deform, without destroying the crystalline lattice thereof, in order to accommodate and join to one another in a substantially voidless manner. The powdered particles can, for the most part, be considered to be individual crystallites. It is apparent that the voidless article will be polycrystalline and of substantially theoretical density.

The polycrystalline optical element produced by hot pressing according to the present invention is substantially voidless and, therefore, contains no noticeable infrared radiation scattering sites. This permits the titanium dioxide polycrystalline article to transmit infrared radiation. It is necessary that the polycrystalline article be at least 99% of theoretical density if the desirable infrared transmittance is to be attained.

It is preferable that the titanium dioxide crystalline elements be produced from powdered particles of substantially the same nature and size. Thus, since each powdered particle can be considered as a crystallite, the present element is substantially homogeneously polycrystalline. Even though the small crystallites in the polycrystalline element of the instant invention may display the planes of cleavage which are so detrimental to large single crystals or macro crystal articles, if a failure is initiated along the plane of cleavage of a crystallite of a hot pressed titanium dioxide article, such failure is arrested at the interface between that crystallite and an adjoining crystallite which would, in all probability, have its plane of cleavage differently oriented.

High quality single crystal materials have high strength in certain directions, but may be fragile along their planes of cleavage. In effect, the instant invention averages the properties of the single crystal so that the hot pressed polycrystalline article displays substantially equal properties without regard to orientation, i.e. it is isotropic. Of course, the above-discussed arrest of incipient failures at crystalline interfaces also enhances the properties of the hot pressed polycrystalline article.

An inert closed die is used to confine the titanium dioxide powder particles while subjecting the charge to additions of relatively high temperatures and pressure conditions. Since the charge consists of powdered particles, it will readily adapt to the shape defined by the pressing die. Thus, the present invention provides versatility in producing optical elements in shapes of lenses, domes, or other configurations required by the art. If the die is accurately formed and carefully polished, the pressed titanium dioxide element will require little or no further working after pressing. However, if desired, the hot pressed polycrystalline infrared transmitting titanium dioxide elements of the instant invention may be pressed in blank or rough form and worked with conventional optical glass forming and polishing methods.

According to the present invention, the titanium dioxide powder is heated to a temperature within the critical range of from 800 to 1300° C. The preferred range is 900 to 1100° C. While at a temperature within this critical range, the powder is subjected to pressure of at least 20,000 p.s.i. This is preferably done under a vacuum or in an inert atmosphere. Optimum pressure is about 30,000 p.s.i. Higher pressures such as 35,000 p.s.i. are operable but do not result in improved properties. Pressure and temperature are maintained at least five minutes and up to thirty minutes, preferably for ten minutes or longer. At times less than five minutes, the properties of the titanium dioxide element may not be optimum as a result of incomplete pressing; and above thirty minutes there may be a loss in transmission at short wavelength. The longer heating and pressing times within the operable range may be used with the benefit of lower pressing temperatures within the operable range.

The titanium dioxide powder is preferably subjected to a cold pressing operation before being hot pressed. Cold pressing should be at a pressure of at least 1000 p.s.i. It is the purpose of the cold pressing to compact the powder and improve heat transfer.

A dome of titanium dioxide illustrates one of the convenient shapes into which titanium dioxide can be hot pressed according to the present invention. Articles can also be pressed as cylinders and plano convex lenses. Lenses can be pressed in carefully polished molds with accurate radius of curvature and the resultant pressing will have a finished optical surface within close tolerances, thus eliminating the need for polishing the article.

Titanium dioxide hot pressed elements display broad infrared transmission to 8 microns wavelength.

Pressing can be carried out in any apparatus capable of generating force produced pressure at least 20,000 p.s.i. or higher, for a given die, e.g. as described in U.S. Patent 3,206,279. The die and coacting parts should be inert to titanium dioxide and may be produced of carbon or high temperature alloys, an alloy of molybdenum and titanium being particularly satisfactory. Foils of inert metals may be used to line the die.

The die should be enclosed and capable of maintaining inert conditions during pressing as an inert atmosphere such as argon, or a vacuum. Heating is preferably by electrical means utilizing induction. If the die is produced of a material which does not properly couple with the field, it may be encased in a material, such as graphite, which will efficiently produce the desired heat.

Pure titanium dioxide is the preferred material. However, minor impurities do not generally detract from the strength of the article but may introduce adsorption bands which curtail infrared transmission at given wavelengths. Thus, for certain uses for which the strength of the article is more important than infrared transmission, impurities can be tolerated.

A titanium dioxide element produced by pressing at a temperature between 800 and 1300° C. at a pressure of at least 20,000 p.s.i. while under a vacuum or in an inert atmosphere will display the following physical properties:

PROPERTIES

| | |
|---|---|
| Color | Water White. |
| I.R. transmission | Long wavelength limit 8 microns. |
| Index of refraction | 2.399 at 2 microns. |
| Hardness (Knoop scale) | 879. |
| Density | 4.25. |
| Thermal shock resistance | Good. |
| High temperature resistance at 1000° C. | Good. |
| Coefficient of expansion | $7.14-9.19 \times 10^{-6}/°C$. |
| Solubility: | |
| In water | Insoluble. |
| In concentrated $H_2SO_4$ | Soluble. |
| Workability, i.e. grinding and polishing | Like glass. |
| Thermal conductivity at 36° C. | $2.1-3.0 \times 10^{-3}$ cal./(cm. sec. °C.) |

The invention has been described in detail with particular reference to preferred embodiments thereof, but it will be understood that variations and modifications can be effected within the spirit and scope of the invention as described hereinabove and as defined in the appended claims.

We claim:
1. A method for producing titanium dioxide infrared transmitting optical elements comprising molding crystalline titanium dioxide powder into a polocrystalline isotropic compact at a temperature within the range of 800 to 1300° C. while pressing said powder at a pressure substantially greater than 20,000 p.s.i. under inert conditions for at least 5 minutes until a density is obtained of at least 99% of the theoretical density and an infrared transparency to 8 microns is secured.

2. A method in accordance with claim 1 comprising pressing said titanium dioxide powder while at a temperature within the range of 900 to 1100° C. until the titanium dioxide powder forms a coherent infrared transparent compact of at least 99% of theoretical density.

3. A method in accordance with claim 1 wherein said titanium dioxide powder is pressed at a pressure of about 30,000 p.s.i.

4. The method set forth in claim 2 wherein the pressing is carried out in an inert gas atmosphere.

5. The method set forth in claim 2 wherein the pressing is carried out in a vacuum.

6. The method set forth in claim 1, also comprising first cold pressing said titanium dioxide powder into a compact prior to heating said compact under the specified conditions.

7. An article of manufacture which transmits in the infrared regions of the electromagnetic spectrum to 8 microns wavelength, consisting essentially of a hot-pressed homogeneous isotropic solid of polycrystalline titanium dioxide, said article having a density in the range of from 99% up to and including theoretical density.

8. An article of manufacture in accordance with claim 7 wherein said homogeneous solid consists essentially of titanium dioxide powder.

9. An article of manufacture in accordance with claim 7 wherein said solid is hot pressed from particles of powder size at a temperature within the range of 800–1300° C. and a pressure substantially greater than 20,000 p.s.i.

References Cited

UNITED STATES PATENTS

| | | | |
|---|---|---|---|
| 3,343,915 | 9/1967 | Rossi et al. | 23—141 |
| 3,206,279 | 9/1965 | Carnall | 23—88 |
| 3,301,635 | 1/1967 | Bergna et al. | 23—182 |
| 3,365,271 | 1/1968 | Carnall et al. | 23—88 |
| 3,141,782 | 7/1964 | Livey et al. | 23—313 XR |

EDWARD STERN, Primary Examiner

U.S. Cl. X.R.

106—39, 55; 264—332; 350—1, 2